United States Patent
Hosoi et al.

(10) Patent No.: US 9,020,170 B2
(45) Date of Patent: Apr. 28, 2015

(54) HEARING SYSTEM AND FINGER RING FOR THE HEARING SYSTEM

(75) Inventors: Hiroshi Hosoi, Osaka (JP); Yoji Hosoi, Osaka (JP); Masahide Tanaka, Osaka (JP)

(73) Assignees: Rohm Co., Ltd., Kyoto (JP); Finewell Co., Ltd., Osaka (JP)

( * ) Notice: Subject to any disclaimer, the term of this patent is extended or adjusted under 35 U.S.C. 154(b) by 0 days.

(21) Appl. No.: 13/985,913

(22) PCT Filed: Feb. 13, 2012

(86) PCT No.: PCT/JP2012/053231
§ 371 (c)(1),
(2), (4) Date: Aug. 16, 2013

(87) PCT Pub. No.: WO2012/114917
PCT Pub. Date: Aug. 30, 2012

(65) Prior Publication Data
US 2013/0322670 A1    Dec. 5, 2013

(30) Foreign Application Priority Data
Feb. 25, 2011  (JP) .................................. 2011-040293

(51) Int. Cl.
*H04R 25/00*  (2006.01)
*H04R 25/04*  (2006.01)

(52) U.S. Cl.
CPC .......... *H04R 25/554* (2013.01); *H04R 2460/13* (2013.01); *H04R 25/04* (2013.01); *H04R 25/558* (2013.01); *H04R 2420/03* (2013.01)

(58) Field of Classification Search
USPC ......................................... 381/151, 315, 380
See application file for complete search history.

(56) References Cited

U.S. PATENT DOCUMENTS 6,380,923 B1 *  4/2002  Fukumoto et al. ............. 345/156
7,437,122 B2 * 10/2008  Choi .................................. 455/7
(Continued)

FOREIGN PATENT DOCUMENTS

JP   10-136480    5/1998
JP   2000-49935   2/2000
(Continued)

OTHER PUBLICATIONS

Japanese Patent Office, International Search Report for International Patent Application PCT/JP2012/053231 (Mar. 13, 2012).

*Primary Examiner* — Ahmad F Matar
*Assistant Examiner* — Norman Yu
(74) *Attorney, Agent, or Firm* — Fish & Richardson P.C.

(57) ABSTRACT

The hearing system comprises a finger ring and a hearing device body. The finger ring includes: a first short-distance wireless communication portion; a vibration output portion disposed at a position that contacts a finger to convert a voice signal, which is received by the first short-distance wireless communication portion, into a cartilage conduction vibration and outputs it; and a first power source portion that supplies power to the first short-distance wireless communication portion and the vibration output portion. The talk device body includes: a second short-distance wireless communication portion that communicates with the first short-distance wireless communication portion; a microphone; a voice signal output portion that makes the second short-distance wireless communication portion output the voice signal according to a voice captured by the microphone; and a second power source portion that supplies power to the second short-distance wireless communication portion, the microphone, and the voice signal output portion.

12 Claims, 9 Drawing Sheets

(56) References Cited

U.S. PATENT DOCUMENTS

| | | | |
|---|---|---|---|
| 7,555,136 B2 * | 6/2009 | Wang | 381/380 |
| 2002/0115478 A1 | 8/2002 | Fujisawa et al. | |
| 2005/0207599 A1 * | 9/2005 | Fukumoto et al. | 381/151 |
| 2010/0098269 A1 * | 4/2010 | Abolfathi et al. | 381/151 |

FOREIGN PATENT DOCUMENTS

| | | |
|---|---|---|
| JP | 2002-84575 | 3/2002 |
| JP | 2003-218989 | 7/2003 |
| JP | 2004-128915 | 4/2004 |
| JP | 2005-348193 | 12/2005 |
| JP | 2006-109326 | 4/2006 |
| JP | 2006-211317 | 8/2006 |
| JP | 2006-333058 | 12/2006 |
| JP | 2009-159577 | 7/2009 |
| JP | 2009-232443 | 10/2009 |
| JP | 4541111 | 7/2010 |

\* cited by examiner

HEARING SYSTEM AND FINGER RING FOR THE HEARING SYSTEM

TECHNICAL FIELD

The present invention relates to a hearing system using cartilage conduction and to a finger ring for the hearing system.

BACKGROUND ART

A patent document 1 proposes, as a method for using a bone conduction speaker that includes a vibration surface pressurized to a tragus to adjust, by means of a manual operation, a pressure between the vibration surface and the tragus pressurized against the vibration surface, thereby changing a transmission ratio of voice information due to cartilage conduction and voice information due to air conduction in accordance with a size of an external noise.

CITATION LIST

Patent Literature

PLT1: JP-4541111

SUMMARY OF INVENTION

Technical Problem

However, to boost usefulness of a hearing system that uses the cartilage conduction, there are many issues to be further studied.

In light of the above issues found by the inventors of the present application, it is an object of the present invention to provide: a useful hearing system that uses the cartilage conduction; and a finger ring for the hearing system.

Solution to Problem

To achieve the above object, a hearing system according to the present invention is a hearing system that comprises a finger ring and a hearing device main body and has a structure (1st structure), in which the finger ring includes: a first short-distance wireless communication portion; a vibration output portion disposed at a position that contacts a finger to convert a voice signal, which is received by the first short-distance wireless communication portion, into a cartilage conduction vibration and outputs the cartilage conduction vibration; and a first power source portion that performs electric power supply to the first short-distance wireless communication portion and the vibration output portion; and the hearing device main body includes: a second short-distance wireless communication portion that performs wireless communication with the first short-distance wireless communication portion; a microphone; a voice signal output portion that makes the second short-distance wireless communication portion output the voice signal according to a voice captured by the microphone; and a second power source portion that performs electric power supply to the second short-distance wireless communication portion, the microphone, and the voice signal output portion.

In the meantime, in the hearing system having the 1st structure, a structure (2nd structure) may be employed, in which the vibration output portion outputs the cartilage conduction vibration transmittable to an ear cartilage via a finger when the finger contacts the ear cartilage.

Besides, in the hearing system having the 1st structure, a structure (3rd structure) may be employed, in which the finger ring further includes a power-source switch that turns on/off a power source of the first power source portion; and wherein the second power source portion is remotely controlled in accordance with an on/off-state of the power-source switch that is transmitted from the first short-distance wireless communication portion via the second short-distance wireless communication portion.

Besides, the hearing system according to the present invention is a hearing system that comprises the finger ring and the hearing device main body, and has a structure (4th structure), in which the finger ring includes: a power-source switch that turns on/off a power source; a first short-distance wireless communication portion that transmits an on/off-state of the power-source switch; and a first power source portion that performs electric power supply to the first short-distance wireless communication portion, and the hearing device main body includes: a second short-distance wireless communication portion that performs wireless communication with the first short-distance wireless communication portion; a microphone; a voice signal output portion that outputs a voice captured by the microphone as a hearing device voice; and a second power source portion that is remotely controlled in accordance with the on/off-state of the power-source switch, which is transmitted from the first short-distance wireless communication portion via the second short-distance wireless communication portion, and performs electric power supply to the microphone and the voice signal output portion.

Besides, the finger ring for the hearing system according to the present invention is a finger ring used for the talk system, and has a structure (5th structure), which includes: a short-distance wireless communication portion; a vibration output portion disposed at a position that contacts a finger to convert a voice signal, which is received by the short-distance wireless communication portion, into a cartilage conduction vibration and outputs the cartilage conduction vibration; and a power source portion that performs electric power supply to the short-distance wireless communication portion and the vibration output portion.

In the meantime, the finger ring having the 5th structure may be structured (6th structure) to further include a power-source switch that turns on/off a power source of the power source portion; wherein the short-distance wireless communication portion outputs an on/off-state of the power source portion to outside.

Besides, in the finger ring having the 6th structure, a structure (7th structure) may be employed, in which the power-source switch includes a self-holding function that holds the on-state for a predetermined self-time span; and wherein count operation during the self-holding time span is reset at each turning-on operation of the power source portion and restarted.

Besides, in the finger ring having the 5th structure, a structure (8th structure) may be employed, in which the vibration output portion includes a piezoelectric bimorph; and wherein the power source portion includes a voltage step-up circuit that drives the piezoelectric bimorph.

Besides, in the finger ring having the 5th structure, a structure (9th structure) may be employed, in which the vibration output portion includes an electromagnetic vibration portion.

Besides, in the finger ring having the 5th structure, a structure (10th structure) may be employed, in which the hearing system is a hearing aid system.

Besides, the finger ring having the 5th structure may be structured (11th structure) to further include a microphone.

Besides, in the finger ring having the 5th structure, a structure (12th structure) may be employed, in which the hearing system is for a mobile phone system.

Besides, the finger ring having the 12th structure may be structured (13th structure) to further include a control portion that receives an incoming alert signal via the short-distance wireless communication portion to make the power source portion start the electric power supply.

Besides, the finger ring having the 13th structure may be structured (14th structure) to further include an incoming alert vibration portion that notifies a phone call based on the incoming alert signal.

Besides, in the finger ring having the 14th structure, a structure (15th structure) may be employed, in which the vibration output portion doubles as the incoming alert vibration portion.

Besides, the finger ring having the 12th structure may be structured (16th structure) to further include a manual operation switch; wherein the short-distance wireless communication portion outputs a signal corresponding to a call/answer operation by the manual switch to the mobile phone.

Besides, in the finger ring having the 12th structure, a structure (17th structure) may be employed, in which the vibration output portion includes a piezoelectric bimorph; and wherein the power source portion includes a voltage step-up circuit that drives the piezoelectric bimorph.

Besides, in the finger ring having the 12th structure, a structure (18th structure) may be employed, in which the vibration output portion includes an electromagnetic vibration portion.

Besides, in the finger ring having the 5th structure, a structure (19th structure) may be employed, in which the vibration output portion outputs the cartilage conduction vibration that is transmittable to an ear cartilage via a finger when the finger contacts the ear cartilage.

Besides, in the finger ring having the 19th structure, a structure (20th structure) may be employed, in which the ear cartilage is of a tragus.

Advantageous Effects of Invention

According to the present invention, it is possible to provide a useful hearing system that uses the cartilage conduction.

DESCRIPTION OF EMBODIMENTS

<Whole Picture of System>

Figure 1:
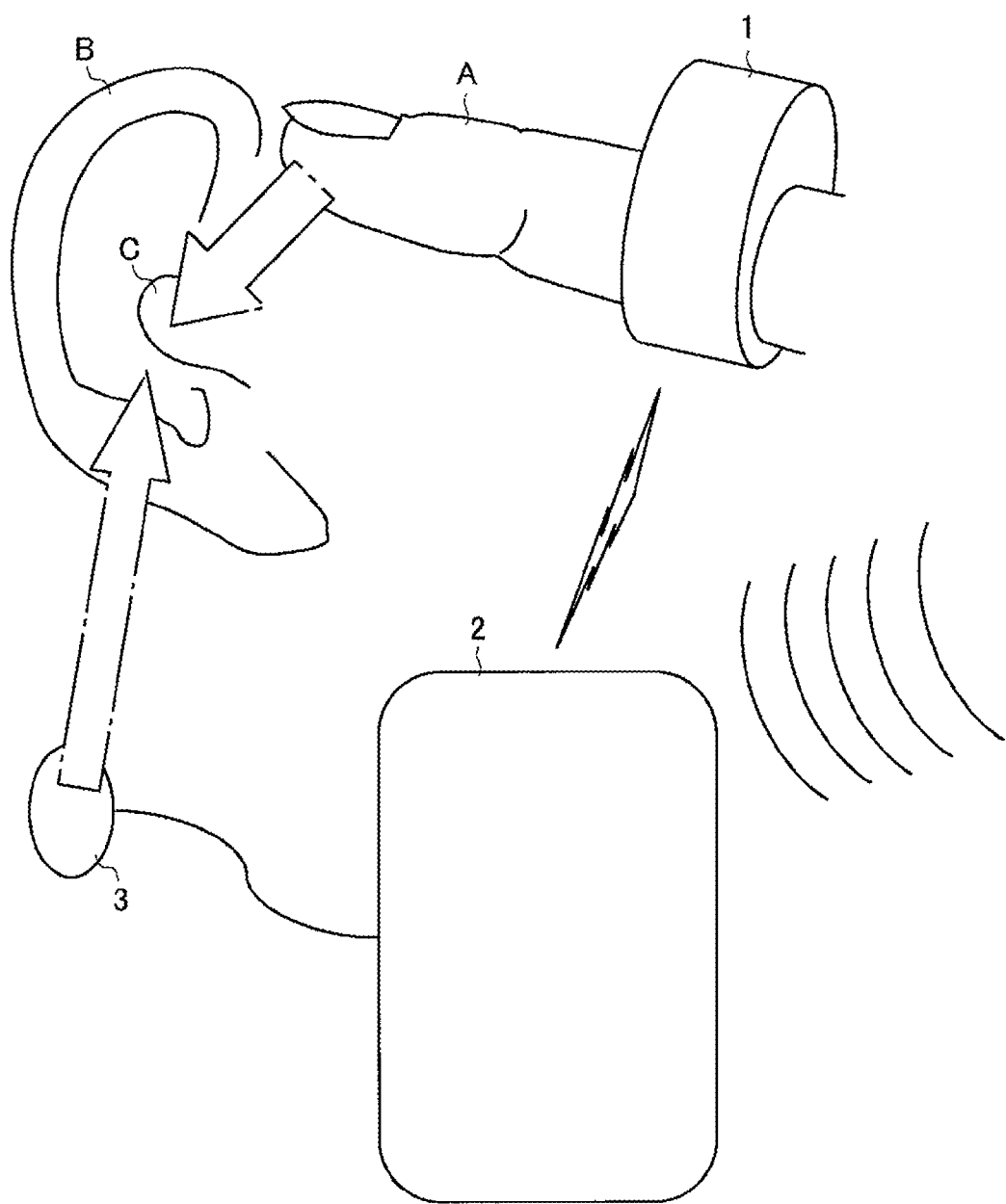
FIG. 1 is a schematic view showing schematically a whole picture of a hearing system according to the present invention.

FIG. 1 is a schematic view showing schematically a whole picture of a hearing system according to the present invention. The hearing system (hearing aid system, mobile phone system and the like) according to the present invention has: a finger ring 1; a hearing device main body 2; and an ear piece 3. FIG. 1 shows a structure (of first to fourth embodiments described later, a structure according to the first embodiment (FIG. 2) and the third embodiment (FIG. 4) especially) in which the finger ring 1 and the hearing device main body 2 are disposed separately from each other. In the meantime, when the finger ring 1 is going to be used, the ear piece 3 is demounted from the hearing device main body 2, accordingly, usually, the finger ring 1 and the ear piece 3 are not expected to be used concurrently.

The finger ring 1 is mounted on a finger A (e.g., a third joint) of a user, converts a voice signal input from the hearing device main body 2 into a cartilage conduction vibration, and transmits the cartilage conduction vibration to the finger A. With the cartilage conduction vibration transmitted to the finger A, if the user pressurizes the finger A against a cartilage C (hereinafter, called an ear cartilage C) near an ear B, the cartilage conduction vibration generated by the finger ring 1 is transmitted to the ear cartilage C. As a result of this, the voice signal from the hearing device main body 2 travels as a cartilage conduction sound to a cartilage around an external auditory canal, is transmitted to an eardrum by air transmission occurring in the external auditory canal and part of it is directly transmitted to an inner ear via the cartilage. In the meantime, the example of the ear cartilage which is the pressurization target of the finger A is a cartilage which includes a tragus and is situated around an entrance portion of the external auditory canal. The pressurization target of the finger A is not limited to this, and various ear cartilage parts may be used; however, the cartilage around the entrance portion of the external auditory canal including the tragus is effective to generate an air transmission sound in the external auditory canal based on the cartilage conduction and the ear hole is generally recognized as a part to hear a sound, and is a preferred part to trigger an unconscious action of pressurizing the finger A against the ear. Besides, according to this action, when pressuring the finger A against the entrance portion of the external auditory canal, the finger A naturally hits the protruding tragus, accordingly, especially, the tragus draws attention as a contact portion. Further, the tragus has a structure to close the ear hole when pushed, accordingly, is preferable to obtain an earplug bone conduction effect described later. In the meantime, the structure and operation of the finger ring 1 are described in detail later.

The hearing device main body 2 is carried (in a breast pocket and the like) by the user and transmits a voice signal to the finer ring 1 and the ear piece 3. For example, in a case where the hearing system according to the present invention is a hearing aid system, the hearing aid main body serves as the hearing device main body 2, and a voice detected by a microphone is converted into an electric signal and transmitted to the finger ring 1 and the ear piece 3. Besides, in a case where the hearing system according to the present invention is a mobile phone system, the mobile phone main body serves as the hearing device main body 2, and a voice signal received via a telephone line is transmitted to the finger ring 1 and the ear piece 3. In the meantime, the structure and operation of the hearing device main body 2 are described in detail later.

The ear piece 3 is an acoustic small-sized speaker that converts the voice signal input from the hearing device main body 2 into an air vibration. Accordingly, if the ear piece 3 is mounted on the ear B, the voice signal from the hearing device main body 2 is transmitted as an air conduction sound to an auditory nerve (inner ear) via the eardrum (middle ear).

The hearing system according to the present invention is usable, for example, as a preferred hearing aid system for a user who is becoming a little hard of hearing. The user of this hearing aid system does not usually mount the ear piece 3 onto the ear B, but pressurizes temporarily the finger A against the ear cartilage C only in a case where the hearing aid is needed (e.g., a case where the other person's voice is low or far), whereby it becomes possible to aid the hearing of the voice by using the cartilage conduction. In the meantime, the action of pressurizing the finger A against the ear cartilage C resembles a natural action of hearing the other person's voice, which accordingly does not give a strange feeling to the user, the other person and people around. Besides, by increasing the pressurization force of the finger A to close the external auditory canal by means of the tragus and the like or to close directly the external auditory canal by means of the finger tip, it also becomes possible to increase the hearing capability thanks to the so-called earplug bone conduction effect. In the meantime, the hearing device main body 2 is structured to aid the hearing in the same way as an existing hearing aid system if connected when the user wants to mount the ear piece 3 onto the ear B.

As described above, according to the hearing aid system that includes the finger ring 1 for transmitting the cartilage conduction vibration to the ear cartilage C via the finger A, the user can enjoy daily life without mounting the uncomfortable ear piece 3 as long as the hearing aid is not needed. Besides, in the case where the hearing aid is needed, the user can speedily aid the hearing of the voice thanks to the natural action of pressurizing the finger A against the ear cartilage C. Besides, the finger ring 1 is mounted on the finger A, accordingly, causes less uncomfortable feeling than the ear piece 3 mounted on the ear B, and it also becomes possible to dramatically reduce a physical burden or a mental burden on the user.

In the meantime, FIG. 1 shows, as an example, the structure in which the finger ring 1 and the hearing device main body 2 are disposed separately from each other; however, the structure of the present invention is not limited to this, and the function of the hearing device main body 2 may be suitably built in the finger ring 1. As to these variations, of first to fourth embodiments described hereinafter, the second embodiment (FIG. 3) and the fourth embodiment (FIG. 5) are especially described in detail.

First Embodiment

Figure 2:
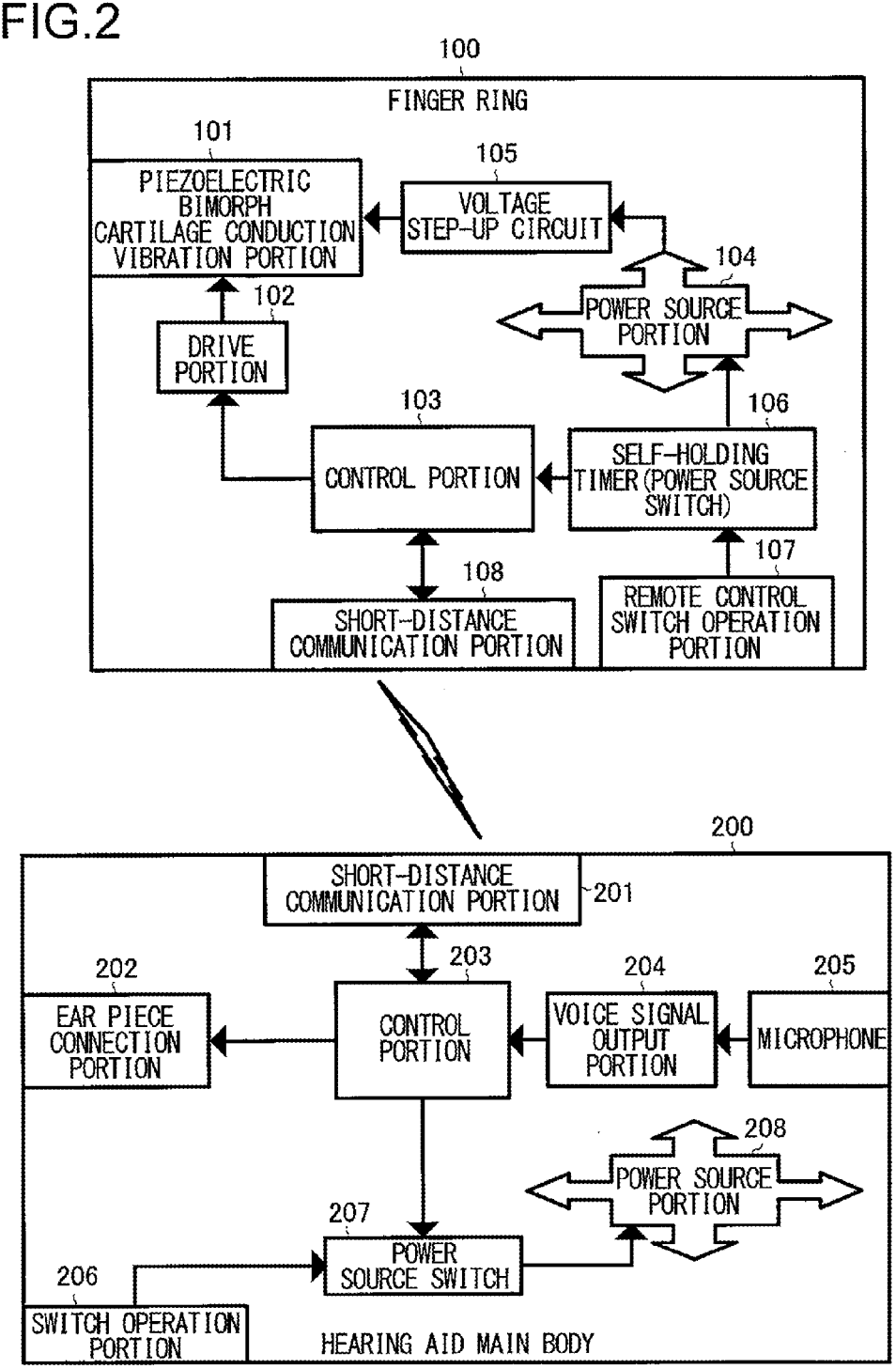
FIG. 2 is a block diagram showing a first embodiment (a hearing aid system that includes a finger ring and a hearing aid main body) of a hearing system.

FIG. 2 is a block diagram which shows a first embodiment (a hearing aid system that includes a finger ring and a hearing aid main body) of the hearing system, and shows a structure equivalent to the schematic view of FIG. 1. The hearing aid system according to the first embodiment has a finger ring 100 and a hearing aid main body 200.

The finger ring 100 is equivalent to the finger ring 1 in FIG. 1 and includes: a piezoelectric bimorph cartilage conduction vibration portion 101; a drive portion 102; a control portion 103; a power source portion 104; a voltage step-up circuit 105; a self-holding timer 106; a remote control switch operation portion 107; and a short-distance communication portion 108.

The piezoelectric bimorph cartilage conduction vibration portion 101 is a vibration output portion that generates and transmits a cartilage conduction vibration to the finger A (see FIG. 1). The piezoelectric bimorph cartilage conduction vibration portion 101 is disposed at a position to contact the finger A with the finger ring 100 mounted on the finger A. The piezoelectric bimorph cartilage conduction vibration portion 101 needs to be supplied with a step-up voltage as a piezoelectric bimorph drive voltage from the voltage step-up circuit 105. Thanks to a combination of the piezoelectric bimorph cartilage conduction vibration portion 101 and the voltage step-up circuit 105, it becomes possible to achieve a compact cartilage conduction vibration portion suitable for the mounting onto the finger ring 100. However, the type of the cartilage conduction vibration portion is not limited to the type that uses the piezoelectric bimorph, and for example, an electromagnetic cartilage conduction vibration potion may be used. In the meantime, in a case where the electromagnetic cartilage conduction vibration portion is used, the voltage step-up circuit is not necessary, accordingly, it becomes possible to simplify the circuit structure.

The drive portion 102 drives the piezoelectric bimorph cartilage conduction vibration portion 101 based on an instruction from the control portion 103.

The control portion 103 is a main body (e.g., CPU [Central Processing Unit]) that comprehensively controls operation of the finger ring 100. For example, the control portion 103 performs drive control of the piezoelectric bimorph cartilage conduction vibration portion 101 via the drive portion 102 such that a voice signal received by the short-distance communication portion 108 is converted into a cartilage conduction vibration and output.

The power source portion 104 generates a predetermined internal voltage from a battery voltage and performs electric power supply to each portion of the finger ring 100.

The voltage step-up circuit 105 steps up the internal voltage generated by the power source portion 104 to produce a drive voltage for the piezoelectric bimorph cartilage conduction vibration portion 101. In the meantime, as the voltage step-up circuit 105, it is possible to use a voltage step-up switching regulator and a voltage step-up charge pump.

The self-holding timer 106 is a power source switch that sends an instruction to the control portion 103 and the power source portion 104 such that the finger ring 100 is kept in an on-state for a predetermined self-holding time span Ton (e.g., 5 minutes) after a power source turning-on operation is received by the remote control switch operation portion 107. In the meantime, count operation of the self-holding time span Ton performed by the self-holding timer 106 is reset and restarted at every time the power source turning-on operation is received by the remote control switch operation portion 107. Accordingly, in a case where another power source turning-on operation is received by the remote control switch operation portion 107 during the count operation of the self-holding time Ton performed by the self-holding timer 106, the power source turning-on period of the finger ring 100 is extended such that the finger ring 100 is kept in the on-state for the self-holding time span Ton from the reception time point. On the other hand, in a case where the power source turning-on operation is not received by the remote control switch operation portion 107 during the self-holding time span Ton, the self-holding timer 106 sends an instruction to the control portion 103 and the power source portion 104 such that the finger ring 100 is switched to an off-state.

According to this structure including the self-holding timer 106, the power source turning-on operation is received by the remote control switch operation portion 107, the finger ring 100 is kept in the on-state for the self-holding time span Ton, thereafter, the finger ring 100 is automatically switched to the off-state. Accordingly, it is possible to perform the hearing aid for a relatively long time without requiring the complicated power source turning-on/off operations. Besides, upon the self-holding time span Ton passing, the power source is automatically turned off, accordingly, it is possible to alleviate wasteful power consumption of the finger ring 100.

Besides, according to the structure including the self-holding timer 106, the count of the self-holding time span Ton restarts after the last operation by only repeating the power source turning-on operations at short natural timings shorter than the self-holding time span Ton, it is possible to extend the power source turning-on period of the finger ring 100.

In the meantime, for example, as described in the example, in the case where a piezoelectric bimorph is used as the cartilage conduction vibration portion 101, there is a case where it takes a predetermined time span for the drive voltage to reach a predetermined target value depending on the voltage step-up circuit and it is impossible to perform the hearing aid using the cartilage conduction immediately after the startup of the finger ring 100. Because of this, if the power source turning-on operation of the finger ring 100 is performed whenever necessary, there is a risk that an important talk immediately after the turning-on of the power source could be missed. In contrast to this, according to the structure including the self-holding timer 106, it is possible to keep the power source portion 104 and the voltage step-up circuit 105 in the on-state after the power source turning-on operation is received by the remote control switch operation portion 107, accordingly, it becomes possible to reduce the risk that the above disadvantage could occur.

The remote control switch operation portion 107 is a user interface that receives the power source turning-on operation of the finger ring 100. For example, in a case where a push button is used as the remote control switch operation portion 107, the use can perform the power source turning-on operation of the finger ring 100 by only pushing the remote control switch operation portion 107 one time.

Based on the instruction from the control portion 103, the short-distance communication portion 108 performs wireless communication with a short-distance communication portion 201 disposed in the hearing aid main body 200. In a specific example, the short-distance communication portion 108 receives a voice signal from the short-distance communication portion 201 and sends the voice signal to the control portion 103. Besides, the short-distance communication portion 108 transmits a remote control switch operation signal from the control portion 103 to the short-distance communication portion 201. The remote control switch operation signal is an information signal that indicates whether the power source turning-on operation is received by the remote control switch operation portion 107 or not, in other words, whether the finger ring 100 is in the on-state or not. In the meantime, as the short-distance communication portion 108, it is possible to suitably use a wireless communication module IC in conformity with wireless communication standards such as Bluetooth (registered trademark) and the like.

The hearing aid main body 200 is equivalent to the hearing device main body 2 in FIG. 1 and includes: the short-distance communication portion 201; an ear piece connection portion 202; a control portion 203; a voice signal output portion 204; a microphone 205; a switch operation portion 206; a power source switch 207; and a power source portion 208.

Based on an instruction from the control portion 203, the short-distance communication portion 201 performs wireless communication with the short-distance communication portion 108 disposed in the finger ring 100. In a specific example, the short-distance communication portion 201 transmits a voice signal from the control portion 203 to the short-distance communication portion 108. Besides, the short-distance communication portion 201 receives a remote control switch operation signal from the short-distance communication portion 108 and sends the signal to the control portion 203. In the meantime, as the short-distance communication portion 201, it is possible to suitably use a wireless communication module IC in conformity with wireless communication standards such as Zigbee (registered trademark), Bluetooth (registered trademark) and the like.

The ear piece connection portion 202 is an interface for connecting the acoustic ear piece 3 (see FIG. 1). According to the structure that includes the ear piece connection portion 202, on the basis of an existing hearing aid system that includes the general ear piece 3 (see FIG. 1) and the hearing aid main body 200, it is possible to compose a hearing aid system that has the finger ring 100 of the cartilage conduction type.

The control portion 203 is a main body (e.g., CPU) that comprehensively controls operation of the hearing aid main body 200. For example, when the hearing aid main body 200 is set at a standby state, the control portion 203 monitors the remote control switch operation signal (on/off-states of the finger ring 100) transmitted via the short-distance communication portion 201 and performs remote control (on/off control) of the power source switch 207 in accordance with the remote control switch operation signal.

As to the hearing aid system, a battery capacity (battery drive time span) is a special issue. Accordingly, the control portion 203 is composed to put the hearing aid main body 200 (more specifically, the power source switch 207) into an on-state associating with the on-state of the finger ring 100. According to this structure, it becomes possible to reduce power consumption of the entire hearing aid system as small as possible when the hearing aid is not necessary and to put the entire hearing aid system into an on-state as soon as the hearing aid becomes necessary.

Besides, in the case where the hearing aid is performed by using the ear piece 3 (see FIG. 1), it is also possible to use the finger ring 100 as a remote controller (remote power source switch) of the hearing aid main body 200. According to this structure, it becomes not only unnecessary to prepare an additional remote controller of the hearing aid main body 200 but also it becomes less risky to lose the remote controller. In the meantime, in a case where the finger ring 100 is equipped with only the remote control function of the hearing aid main body 200, of the constituent components shown in FIG. 2, the piezoelectric bimorph cartilage conduction vibration portion 101, the drive portion 102 and the voltage step-up circuit 105 become unnecessary.

The voice signal output portion 204 applies various signal processes (noise removal process and the like) to a voice signal generated by the microphone 205 and outputs the processed voice signal to the control portion 203.

The microphone 205 converts a voice from around into an electric voice signal.

The switch operation portion 206 is a user interface for receiving a function switchover operation of the hearing aid main body 200. There are three function states prepared (normally on-state, normally off-state, and standby state) for the hearing aid main body 200. In the normally on-state, without depending on the on/off-states of the finger ring 100, the hearing aid main body 200 is always put into the on-state. This function state may be selected in a case where the hearing aid is constantly performed by using the ear piece 3 (see FIG. 1). In the normally off-state, without depending on the on/off-states of the finger ring 100, the hearing aid main body 200 is always put into the off-state. This function state may be selected in a case where the hearing aid is not necessary at all (a case where the user is sleeping and the like). In the standby state, as described above, the on/off-states of the hearing aid main body 200 are remotely controlled associating with the on/off-states of the finger ring 100. This function state may be selected in a case where the hearing aid is performed by using the finger ring 100 in an emergency.

Based on the instruction from the control portion 203 and the switch control portion 206, the power source switch 207 performs on/off control of the power source portion 208.

The power source portion 208 generates a predetermined internal voltage from the battery voltage and performs electric power supply to each portion of the hearing aid main body 200. In the meantime, in a case where the hearing aid main body 200 is kept in the standby state, the power source portion 208 continues electric power supply to a circuit block (the control portion 201 and the short-distance communication portion 203) that is necessary to await and receive the remote control switch operation signal wirelessly transmitted from the finger ring 100, and stops the electric power supply to the other circuit blocks.

Second Embodiment

Figure 3:
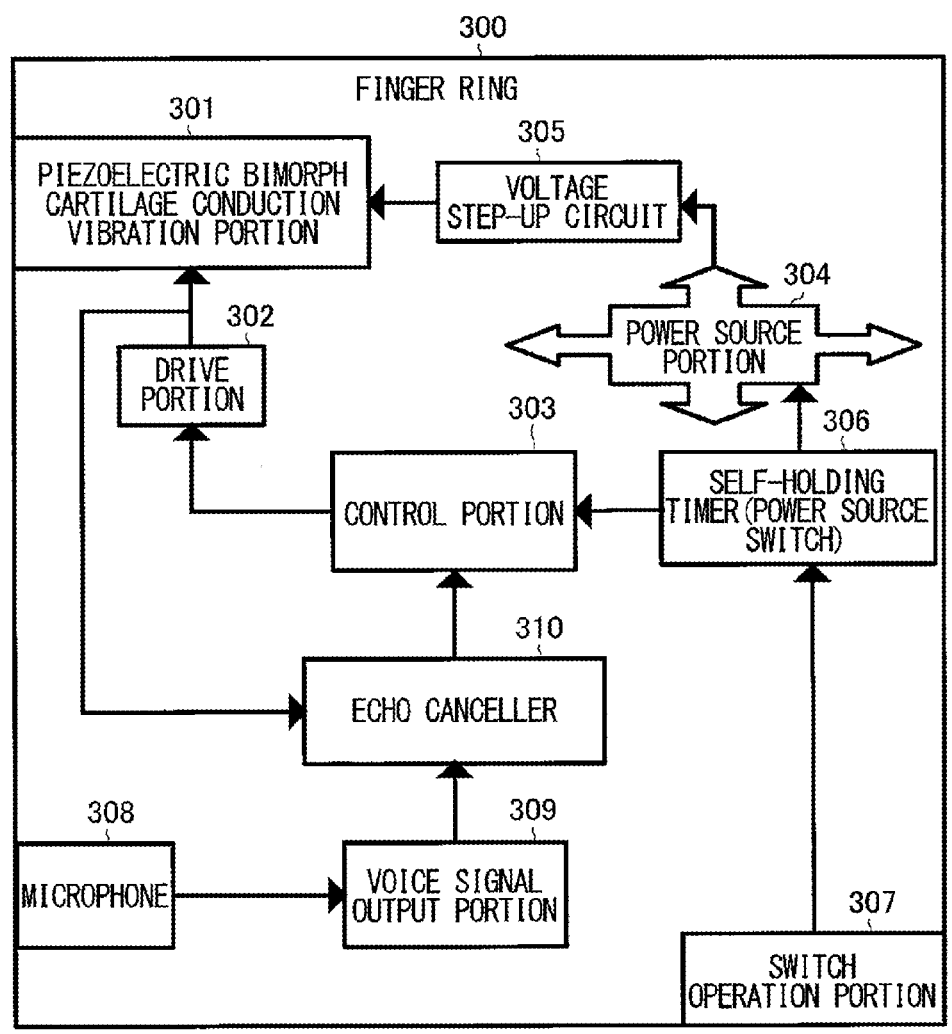
FIG. 3 is a block diagram showing a second embodiment (a hearing aid system that includes a finger ring only) of a hearing system.

FIG. 3 is a block diagram showing a second embodiment (a hearing aid system that includes a finger ring only) of the hearing system. A finger ring 300 forming a hearing aid system according to the second embodiment has a combined structure of the finger ring 100 and hearing aid main body 200 in FIG. 2 and includes: a piezoelectric bimorph cartilage conduction vibration portion 301; a drive portion 302; a control portion 303; a power source portion 304; a voltage step-up circuit 305; a self-holding timer 306; a remote control switch operation portion 307; a microphone 308; a voice signal output portion 309; and an echo canceller 310.

Of the constituent components shown in FIG. 3, the piezoelectric bimorph cartilage conduction vibration portion 301, the drive portion 302, the control portion 303, the power source portion 304, the voltage step-up portion 305, the self-holding timer 306, the remote control switch operation portion 307, the microphone 308, the voice signal output portion 309 are equivalent to the piezoelectric bimorph cartilage conduction vibration portion 101, the drive portion 102, the control portion 103, the power source portion 104, the voltage step-up portion 105, the self-holding timer 106, the remote control switch operation portion 107, the microphone 205, the voice signal output portion 204 in FIG. 2, respectively. Accordingly, hereinafter, description is performed focusing on characterizing constituent components and operation of the second embodiment, and description overlapping the first embodiment is suitably skipped.

The control portion 303 performs drive control of the piezoelectric bimorph cartilage conduction vibration portion 301 via the drive portion 302 such that a voice signal transmitted from the voice signal output portion 309 via the echo canceller 310 is converted into a cartilage conduction vibration and output.

The echo canceller 310 generates, by means of an adapted filter, a quasi-echo signal from a drive signal that is supplied from the drive portion 302 to the piezoelectric bimorph cartilage conduction vibration portion 301, and adds the quasi-echo signal to the voice signal from the voice signal output portion 309. According to the structure in which the echo canceller 310 is disposed, it becomes possible to suitably cancel an echo component (vibration component of the piezoelectric bimorph cartilage conduction vibration portion 301 detected by the microphone 308) contained in the voice signal from the voice signal output portion 309.

As described above, according to the hearing aid system that uses the finger ring 300 incorporating the microphone, the hearing aid main body becomes unnecessary, accordingly, it becomes possible to raise mobility of the hearing aid system.

Third Embodiment

Figure 4:
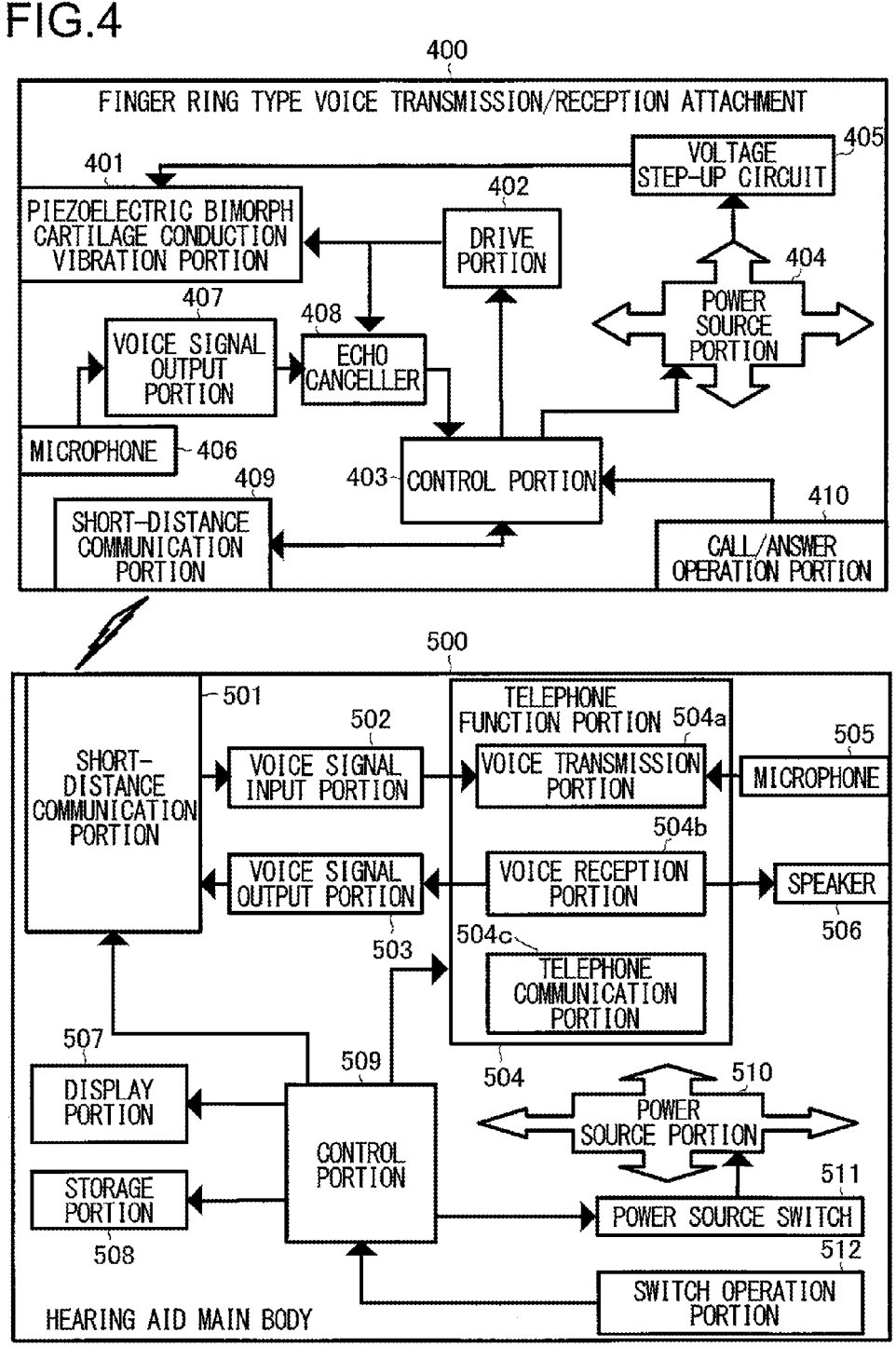
FIG. 4 is a block diagram showing a third embodiment (a hearing aid system that includes a finger ring and a mobile phone main body) of a hearing system.

FIG. 4 is a block diagram showing a third embodiment (a mobile phone system that includes a finger ring and a mobile phone main body) of the hearing system. The mobile phone system according to the third embodiment has a finger ring type voice transmission/reception attachment 400 and a mobile phone main body 500.

The finger ring type call/answer attachment 400 is equivalent to the finger ring 1 in FIG. 1 and includes: a piezoelectric bimorph cartilage conduction vibration portion 401; a drive portion 402; a control portion 403; a power source portion 404; a voltage step-up circuit 405; a microphone 406; a voice signal output portion 407; an echo canceller 408; a short-distance communication portion 409; and a call/answer operation portion 410.

The piezoelectric bimorph cartilage conduction vibration portion 401 is a vibration output portion that generates and transmits a cartilage conduction vibration to the finger A (see FIG. 1). The piezoelectric bimorph cartilage conduction vibration portion 401 is disposed at a position to contact the finger A with the finger ring type voice transmission/reception attachment 400 mounted on the finger A. The piezoelectric bimorph cartilage conduction vibration portion 401 needs to be supplied with a step-up voltage as a piezoelectric bimorph drive voltage from the voltage step-up circuit 405. Thanks to a combination of the piezoelectric bimorph cartilage conduction vibration portion 401 and the voltage step-up circuit 405, it becomes possible to achieve a compact cartilage conduction vibration portion suitable for the mounting onto the finger ring type voice transmission/reception attachment 400. However, the type of the cartilage conduction vibration portion is not limited to the type that uses the piezoelectric bimorph, and for example, an electromagnetic cartilage conduction vibration portion may be used. In the meantime, in a case where the electromagnetic cartilage conduction vibration portion is used, the voltage step-up circuit is not necessary, accordingly, it becomes possible to simplify the circuit structure.

The drive portion 402 drives the piezoelectric bimorph cartilage conduction vibration portion 401 based on an instruction from the control portion 403.

The control portion 403 is a main body (e.g., CPU) that comprehensively controls operation of the finger ring type voice transmission/reception attachment 400. For example, the control portion 403 performs drive control of the piezoelectric bimorph cartilage conduction vibration portion 401 via the drive portion 402 such that an incoming voice signal received by the short-distance communication portion 409 is converted into a cartilage conduction vibration and output. Besides, the control portion 403 performs communication control of the short-distance communication portion 409 such that an outgoing voice signal generated by the microphone 406 is wirelessly transmitted to the mobile phone main body 500.

Besides, the control portion 403 performs drive control of the piezoelectric bimorph cartilage conduction vibration portion 401 via the drive portion 402 such that an incoming alert vibration is generated in accordance with an incoming signal from the mobile phone main body 500. According to this structure, it becomes possible to notify the user of an incoming to the mobile phone main body 500. In the meantime, if the piezoelectric bimorph cartilage conduction vibration portion 401 doubles as an incoming alert vibration portion, size enlargement of the finger ring type voice transmission/reception attachment 400 is not incurred. Of course, separately from the piezoelectric bimorph cartilage conduction vibration portion 401, an incoming alert vibration portion dedicated to the incoming alert may be disposed.

Besides, when the incoming alert signal from the mobile phone main body 500 is received by the short-distance communication portion 409, or when the user's call operation is received by the call/answer operation portion 410, the control portion 403 performs on/off control of the power source portion 404 such that electric power supply to the finger ring type voice transmission/reception attachment 400 is started. According to this structure, it becomes possible to reduce power consumption of the finger ring type voice transmission/reception attachment 400 and to extend the battery drive time span.

The power source portion 404 generates a predetermined internal voltage from the battery voltage and performs electric power supply to each portion of the finger ring type voice transmission/reception attachment 400. In the meantime, in a case where the finger ring type voice transmission/reception attachment 400 is kept in a standby state, the power source portion 404 continues awaiting and receiving the incoming alert signal wirelessly transmitted from the mobile phone main body 500 and electric power supply to a circuit block (the control portion 403, the short-distance communication portion 409 and the call/answer operation portion 410) that is necessary to await and receive the call operation by the user, and stops the electric power supply to the other circuit blocks.

The voltage step-up circuit 405 steps up an internal voltage generated by the power source portion 404 to produce a drive voltage for the piezoelectric bimorph cartilage conduction vibration portion 401. In the meantime, as the voltage step-up circuit 405, it is possible to use a voltage step-up switching regulator and a voltage step-up charge pump.

The microphone 406 converts a voice (voice released from the user) from around into an electric voice signal.

The voice signal output portion 407 applies various signal processes (noise removal process and the like) to the voice signal generated by the microphone 406 and outputs the processed voice signal to the echo canceller 408.

The echo canceller 408 generates a quasi-echo signal from a drive signal that is supplied from the drive portion 402 to the piezoelectric bimorph cartilage conduction vibration portion 401, adds the quasi-echo signal to the voice signal from the voice signal output portion 407 and outputs the signal to the control portion 403. According to the structure in which the echo canceller 408 is disposed, it becomes possible to suitably cancel an echo component (vibration component of the piezoelectric bimorph cartilage conduction vibration portion 401 detected by the microphone 406) contained in the voice signal from the voice signal output portion 407.

Based on an instruction from the control portion 403, the short-distance communication portion 409 performs wireless communication with the short-distance communication portion 501 disposed in the mobile phone man body 400. In a specific example, the short-distance communication portion 409 receives an incoming voice signal from the short-distance communication portion 501 and transmits the signal to the control portion 403. Besides, the short-distance communication portion 409 transmits a signal (hereinafter, called a call/answer operation signal) corresponding to a call/answer operation received by the call/answer operation portion 410 and transmits the signal to the short-distance communication portion 501. In the meantime, as the short-distance communication portion 409, it is possible to suitably use a wireless communication module IC in conformity with wireless communication standards such as Bluetooth (registered trademark) and the like.

The call/answer operation portion 410 is a user interface (manual operation switch) that receives a call/answer operation by the user.

The mobile phone main body 500 is equivalent to the hearing device main body 2 in FIG. 1 and includes: the short-distance communication portion 501; a voice signal input portion 502; a voice signal output portion 503; a telephone function portion 504; a microphone 505; a speaker 506; a display portion 507; a storage portion 508; a control portion 509; a power source portion 510; a power source switch 511; and a switch operation portion 512.

Based on an instruction from the control portion 509, the short-distance communication portion 501 performs wireless communication with the short-distance communication portion 409 disposed in the finger ring type voice transmission/reception attachment 400. In a specific example, the short-distance communication portion 501 transmits an incoming voice signal from the voice signal output portion 503 to the short-distance communication portion 409. Besides, the short-distance communication portion 501 receives an outgoing voice signal from the short-distance communication portion 409 and sends the signal to the voice signal input portion 502. Besides, the short-distance communication portion 501 receives the call/answer operation signal from the short-distance communication portion 409 and transmits the signal to the control portion 509. In the meantime, as the short-distance communication portion 501, it is possible to suitably use a wireless communication module IC in conformity with wireless communication standards such as Bluetooth (registered trademark) and the like. Accordingly, the short-distance communication portion 501 can perform the short-distance wireless communication with not only the finger ring type voice transmission/reception attachment 400 but also voice transmission/reception attachments such as a vehicle audio device, a head set and the like.

The voice signal input portion 502 sends the outgoing voice signal received by the short-distance communication portion 501 to the telephone function portion 504 (especially, a voice transmission portion 504*a*).

The voice signal output portion 503 sends the incoming voice signal received by the telephone function portion 504 (especially, voice reception portion 504*b*) to the short-distance communication portion 501.

The telephone function portion 504 is able to perform a voice talk via a wireless telephone line by using the voice transmission portion 504*a* and the voice reception portion 504*b*. Besides, the telephone function portion 504 is also able to perform data communication via the wireless telephone line by using the telephone communication portion 504*c*.

Besides, the telephone function portion 504 includes a function to switch input/output ports of the voice transmission portion 504*a* and voice reception portion 504*b* in accordance with whether the short-distance wireless communication is performed or not between the mobile phone main body 500 and an external device (in FIG. 4, the finger ring type voice transmission/reception attachment 400) via the short-distance communication portion 501. For example, in a case where the short-distance wireless communication is performed between the mobile phone main body 500 and the finger ring type voice transmission/reception attachment 400, the outgoing voice signal is transmitted from the voice signal input portion 502 to the voice transmission portion 504a, while the incoming voice signal is transmitted from the voice reception portion 504b to the voice signal output portion 503. On the other hand, in a case where the short-distance wireless communication is not performed between the mobile phone main body 500 and the finger ring type voice transmission/reception attachment 400, the outgoing voice signal is transmitted from the microphone 505 to the voice transmission portion 504a, while the incoming voice signal is transmitted from the voice reception portion 504b to the speaker 506. In other words, in the former case, a voice talk using the finger ring type voice transmission/reception attachment 400 is performed, while in the latter case, a voice talk using the mobile phone main body 500 only is performed.

The microphone 505 converts a voice (voice released from the user) from around into an electric voice signal and transmits the electric voice signal to the voice transmission portion 504a. In the meantime, the microphone 505 acquires a outgoing voice during the voice talk time that uses the mobile phone main body 500 only.

The speaker 506 outputs a incoming alert voice and various guide voices in accordance with control from the control portion 509. Besides, also the speaker 506 outputs a incoming voice during the voice talk time that uses the mobile phone main body 500 only. In the meantime, as the speaker 506, it is also possible to use the ear piece 3 in FIG. 1.

The display portion 507 displays a letter and an image in accordance with the control from the control portion 509. In the meantime, as the display portion 507, it is possible to preferably use a liquid crystal display and an organic EL [Electro Luminescence] display.

The storage portion 508 stores various programs that are read by the control portion 509 and executed. Besides, the storage portion 508 is also used as a temporary storage area for data necessary to the operation of the control portion 509 and as a deploy area for various programs.

The control portion 509 is a main body (e.g., CPU) that comprehensively controls the operation of the mobile phone main body 500.

The power source portion 510 generates a predetermined internal voltage from the battery voltage and performs electric power supply to each portion of the mobile phone main body 500.

Based on instructions from the control portion 509 and the switch operation portion 512, the power source switch 510 performs on/off control of the power source portion 510.

The switch operation portion 512 is a user interface that receives a user operation. In the meantime, as the switch operation portion 512, it is possible to preferably use various keys and buttons, a touch panel and the like.

As described above, the mobile phone system is built by using the finger ring type voice transmission/reception attachment 400 that includes a cartilage conduction vibrator and a small-sized microphone, whereby it becomes possible for the user to perform the incoming confirmation and the voice talk without using the mobile phone main body 500. In the meantime, the cartilage conduction vibrator can double as a manner mode vibrator. In this case, the vibration is not captured by an ear but by a finger, accordingly, it is not necessary to set the vibration frequency into an audible band and is also possible to set a low frequency that is easily captured by the finger. In the meantime, the manner mode vibrator is not limited to the case to double as the cartilage conduction vibrator, and another vibrator may be employed.

In the meantime, in FIG. 4, the structure, in which only one finger ring type voice transmission/reception attachment 400 is connected to the mobile phone main body 500, is described as an example; however, the structure of the present invention is not limited to this, and a structure may be employed, in which the cartilage conduction vibrator, the small-sized microphone and another manner mode vibrator function portion are housed separately from one another in a plurality of the finger ring type voice transmission/reception attachments and connected to one another over the short-distance communication. According to this structure, for example, by housing the cartilage conduction vibrator into a first finger ring type voice transmission/reception attachment mounted on a finger of one hand that easily touches a dominant ear and by housing the small-sized microphone into a second finger ring type voice transmission/reception attachment mounted on a finger of the other hand, it becomes possible to achieve reduction in howling. Besides, a small amount of information is ample for control of the manner mode vibrator, it is also possible to employ short-distance communication means such as Zigbee (registered trademark) and the like. In the meantime, as the block 500 in the third embodiment, not only a usual-sized mobile phone but also a large-screen mobile communication terminal having the telephone function may be employed. In this case, the "mobile phone main body 500" in FIG. 4 is replaced with a "large-screen mobile communication terminal 500" and the like.

Fourth Embodiment

Figure 5:
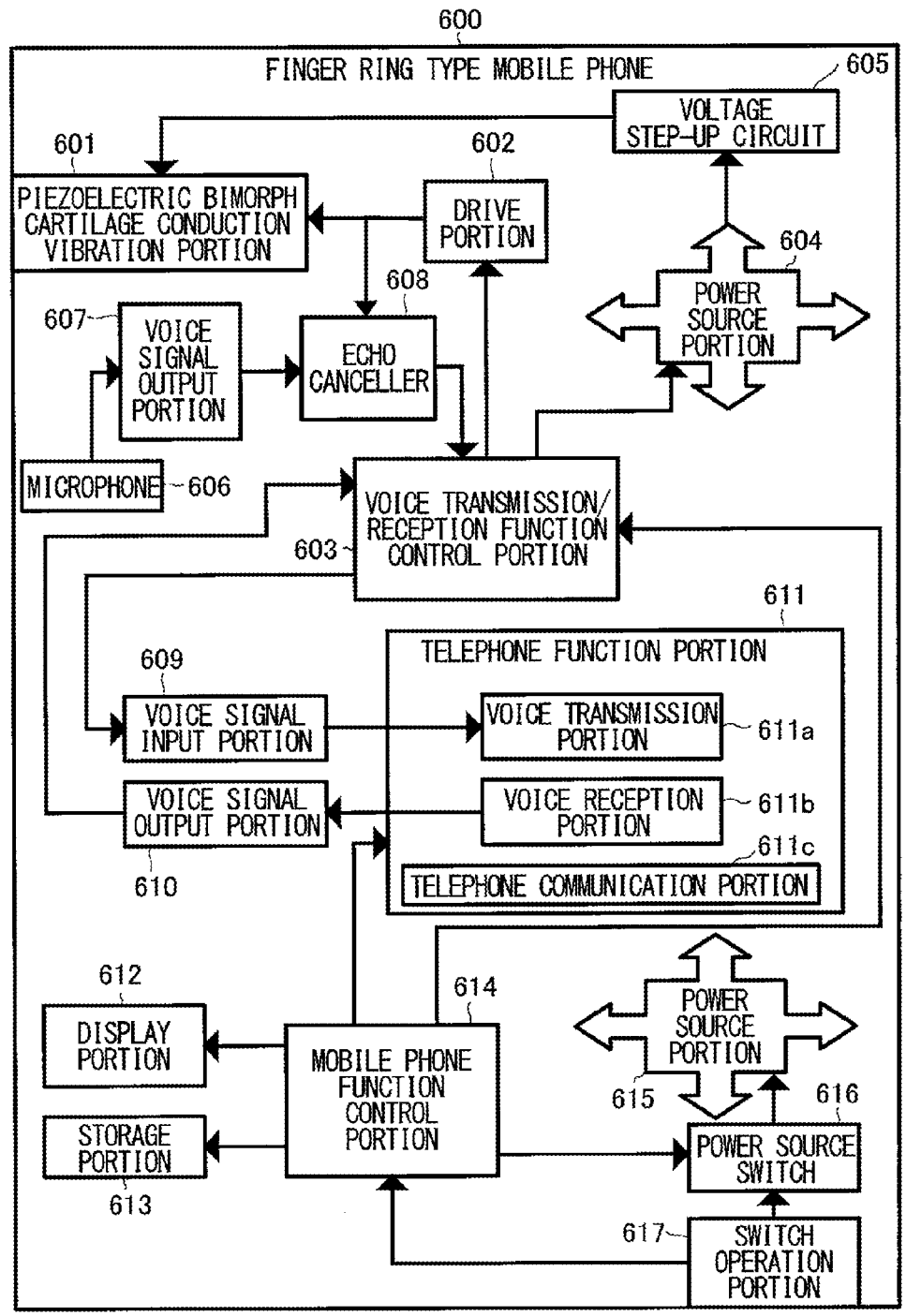
FIG. 5 is a block diagram showing a fourth embodiment (a finger ring type mobile phone) of a hearing system.

FIG. 5 is a block diagram showing a fourth embodiment (finger ring type mobile phone) of the hearing system. A finger ring type mobile phone 600 forming the hearing system according to the fourth embodiment has a combined structure of the finger ring type voice transmission/reception attachment 400 and the mobile phone main body 500 in FIG. 4 and includes: a piezoelectric bimorph cartilage conduction vibration portion 601; a drive portion 602; a voice transmission/reception function control portion 603; a power source portion 604; a voltage step-up circuit 605; a microphone 606; a voice signal output portion 607; an echo canceller 608; a voice signal output portion 609; a voice signal output portion 610; a telephone function portion 611; a display portion 612; a storage portion 613; a mobile phone function control portion 614; a power source portion 615; a power source switch 616; and a switch operation portion 617.

Of the constituent components shown in FIG. 5, the piezoelectric bimorph cartilage conduction vibration portion 601, the drive portion 602, the voice transmission/reception function control portion 603, the power source portion 604, the voltage step-up portion 605, the microphone 606, the voice signal output portion 607, the echo canceller 608, the voice signal input portion 609, the voice signal output portion 610, the telephone function portion 611, the display portion 612, the storage portion 613, the mobile phone function control portion 614, the power source portion 615, the power source switch 616, and the switch operation portion 617 are equivalent to the piezoelectric bimorph cartilage conduction vibration portion 401, the drive portion 402, the control portion 403, the power source portion 404, the voltage step-up portion 405, the microphone 406, the voice signal output portion 407, the echo canceller 408, the voice signal input portion 502, the voice signal output portion 503, the telephone function portion 503, the display portion 507, the storage portion 508, the control portion 509, the power source portion 510, the power source switch 511, and the switch operation portion 512 in FIG. 4, respectively.

In other words, it is sayable that the finger ring type mobile phone 600 has a structure in which finger ring type voice transmission/reception attachment 400 and the mobile phone main body 500 in FIG. 4 are combined with each other and the unnecessary short-distance communication portions 409 and 501 are removed. According to the finger ring type mobile phone 600, the mobile phone main body becomes unnecessary, accordingly, it becomes possible to raise mobility of the mobile phone system.

<Finger Ring>

Figure 6:
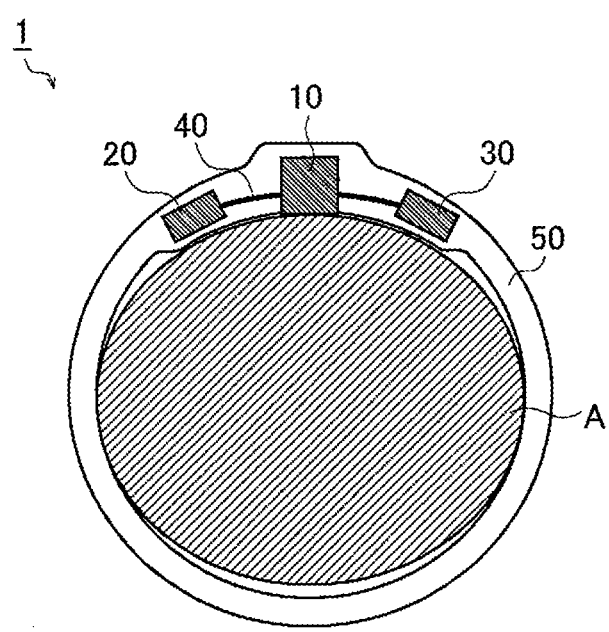
FIG. 6 is a sectional view schematically showing a structural example of a finger ring 1.

FIG. 6 is a sectional view schematically showing a structural example of the finger ring 1. The finger ring 1 in the present structural example has a structure that gives the cartilage conduction vibration to a third joint of the finger A, more specifically, a finger ring structure that s mounted on the third joint of the finger A to give the cartilage conduction vibration. In the meantime, taking a close look at constituent components, the finger ring 1 in the present structural example has: a main unit 10; a power source unit 20; a communication unit 30; a cable 40; and a finger ring type housing 50.

The main unit 10 is a unit that gives the cartilage conduction vibration mainly to the finger A and is housed in the finger ring type housing 50 to oppose the back of the finger A when the finger ring type housing 50 is mounted on the finger A. In the meantime, an internal structure and operation of the main unit 10 are described in detail later.

The power source unit 20 is a unit that performs electric power supply mainly to the main unit 10 and the communication unit 30 and is housed in the finger ring type housing 50 to oppose the back of the finger A when the finger ring type housing 50 is mounted on the finger A. In the meantime, an internal structure and operation of the power source unit 20 are described in detail later.

The communication unit 30 is a unit that performs wireless communication mainly with the hearing device main body 2 and is housed in the finger ring type housing 50 to oppose the back of the finger A when the finger ring type housing 50 is mounted on the finger A. In the meantime, an internal structure and operation of the communication unit 30 are described in detail later.

The cable 40 is housed in the finger ring type housing 50 to electrically connect the main unit 10, the power source unit 20 and the communication unit 30 to one another.

The finger ring type housing 50 houses the main unit 10; the power source unit 20; the communication unit 30; and the cable 40, and is mounted on the third joint of the finger A.

As described above, according to the finger ring 1 mounted on the third joint of the finger A, as long as the user does not intentionally try to demount the finger ring 1 from the finger A, there is almost no risk that the finger ring 1 could come off the finger A in daily life, accordingly, it becomes possible to build a hearing system that does not restrict the user's action.

In the meantime, if the finger ring type housing 50 is formed of a flexible material (silicone rubber and the like), it becomes possible to give a great degree of freedom to the mountable size of the finger ring 1.

Besides, it is desirable that the finger ring type housing 50 is formed to have a waterproof structure. According to this structure, even if being wet with water (rain) and sweat, the finger ring type housing becomes unlikely to malfunction. Besides, in a case where the finger ring 1 is shared with many people, by washing the whole finger ring type housing 50, it becomes possible to keep the finger ring 1 clean.

Besides, in the above structural example, the structure, in which the main unit 10, the power source unit 20, and the communication unit 30 are units independent of one another, is described as an example; however, the structure of the present invention is not limited to this, and the plurality of units may be grouped into one. Besides, also the housing positions of the main unit 10, the power source unit 20, and the communication unit 30 in the finger ring type housing 50 are not limited to the above structural example.

<Main Unit>

Figure 7:
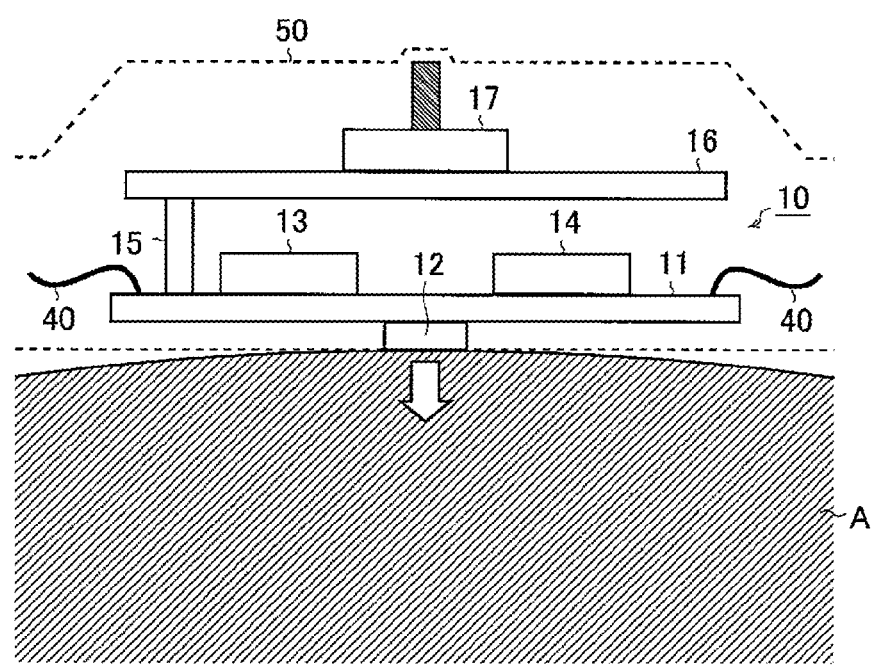
FIG. 7 is a sectional view schematically showing a structural example of a main unit 100.

FIG. 7 is a sectional view schematically showing a structural example of the main unit 10. The main unit 10 in the present structural example includes: a first board 11; a piezoelectric bimorph cartilage conduction vibration portion 12; a control portion 13; a drive portion 14; a connector 15; a second board 16; and an operation portion 17.

The piezoelectric bimorph cartilage conduction vibration portion 12 is mounted on a front surface of the first board 11, while the control portion 13 and the drive portion 14 are directly mounted on a rear surface of the first board 11. Besides, the first board 11 is also connected to the cable 40 for performing electrical connection between the power source unit 20 and the communication unit 30. In the meantime, electrical connection is performed between the front surface and the rear surface of the first board 11 via a through-hole and a via. As described above, by effectively using both surfaces of the first board 11, it is possible to reduce the area of the first board 11, accordingly, it becomes possible to limit the main unit 10 to a size that does not become larger than the third joint of the finger A, which does not give a feeling of the mounting of the finger ring 1 to the user.

The piezoelectric bimorph cartilage conduction vibration portion 12 is a vibration output portion that generates and transmits the cartilage conduction vibration to the finger A (see FIG. 1), and is equivalent to the above piezoelectric bimorph cartilage conduction vibration portion 101 (FIG. 2), the piezoelectric bimorph cartilage conduction vibration portion 301 (FIG. 3), the piezoelectric bimorph cartilage conduction vibration portion 401 (FIG. 4), or the piezoelectric bimorph cartilage conduction vibration portion 601 (FIG. 5). As shown in FIG. 7, the piezoelectric bimorph cartilage conduction vibration portion 12 is disposed at a position to contact the finger A with the finger ring 1 mounted on the finger A.

The control portion 13 is a main body (e.g., CPU) that comprehensively controls the operation of the finger ring 1, and is equivalent to the above control portion 103 (FIG. 2), the control portion 303 (FIG. 3), the control portion 403 (FIG. 4), or the voice transmission/reception function control portion 603 and mobile phone function control portion 614 (FIG. 5).

The drive portion 14 is a driver that drives the piezoelectric bimorph cartilage conduction vibration portion 12 in accordance with an instruction from the control portion 13, and is equivalent to the above drive portion 102 (FIG. 2), the drive portion 302 (FIG. 3), the drive portion 402 (FIG. 4), or the drive portion 602 (FIG. 5).

The connector 15 is an electroconductive portion that vertically stacks up the first board 11 and the second board 16.

The operation portion 17 is directly mounted on a front surface of the second board 16, while the connector 15 is connected to a rear surface of the second board 16. In the meantime, electrical connection is performed between the front surface and the rear surface of the second board 16 via a through-hole and a via.

As described above, by employing the stacked-up structure of the plurality of boards, compared with a structure in which all circuit elements are mounted on one board, it is possible to reduce the respective areas of the first board 11 and the second board 16. Accordingly, it becomes possible to limit the main unit 10 to a size that does not become larger than the third joint of the finger A, which does not give a feeling of the mounting of the finger ring 1 to the user.

The operation portion 17 is a user interface that receives the user's operation, and is equivalent to the above remote control switch operation portion 107 (FIG. 2), the switch operation portion 307 (FIG. 3), the call/answer operation portion 410 (FIG. 4), or the switch operation portion 617 (FIG. 5). In the meantime, a structure may be employed, in which to avoid a careless erroneous operation in a case where the hand's back collides with a door and the like and in other such cases, the operation portion 17 is not mounted on an upper surface of the finger ring as shown in FIG. 7 but on a side surface of the finger ring.

<Power Source Unit>

Figure 8:
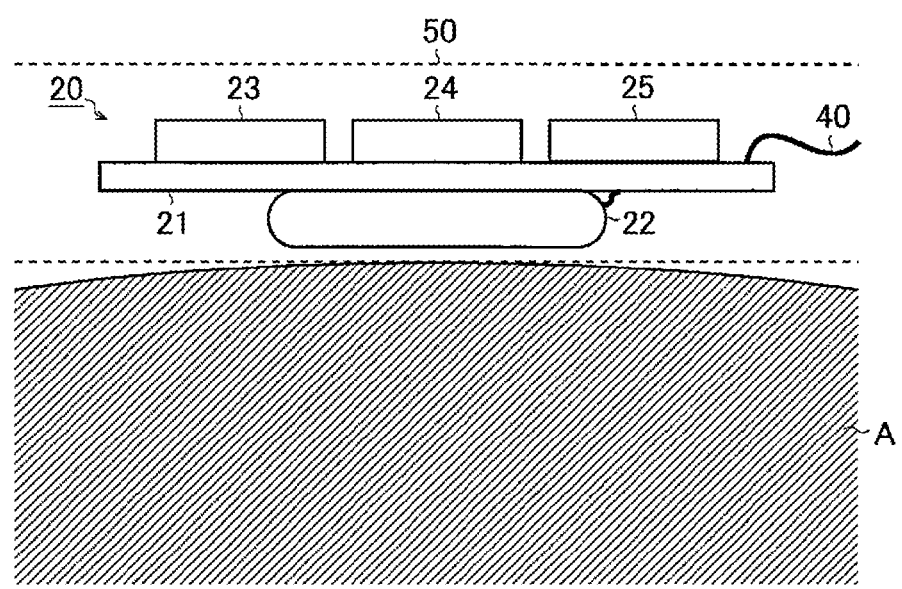
FIG. 8 is a sectional view schematically showing a structural example of a power source unit 200.

FIG. 8 is a sectional view schematically showing a structural example of the power source unit 20. The power source unit 20 in the present structural example includes: a board 21; a battery 22; a power source portion 23; a voltage step-up circuit 24; and a recharge circuit 25.

The battery 22 is mounted on a front surface of the board 21, while the power source portion 23, the voltage step-up circuit 24 and the recharge circuit 25 are directly mounted on a rear surface of the board 21. Besides, the board 21 is also connected to the cable 40 for performing electrical connection with the main unit 10. In the meantime, electrical connection is performed between the front surface and the rear surface of the board 21 via a through-hole and a via. As described above, by effectively using both surfaces of the board 21, it is possible to reduce the area of the board 21, accordingly, it becomes possible to achieve size reduction of the power source unit 20, which does not give a feeling of the mounting of the finger ring 1 to the user.

The battery 22 is an electric power supply source necessary for the driving of the finger ring 1, and it is possible to preferably use a lithium ion secondary battery, an electric double-layer capacitor and the like. As described above, according to the finger ring 1 of the battery drive type, it is not necessary to connect an external electric power supply cable, accordingly, it is possible to avoid restricting the user's action when building the hearing system that use the finger ring 1. In the meantime, in the present structural example, the battery 22 with high flatness is disposed right over the finger A, accordingly, it becomes possible to raise fitness when the finger ring 1 is mounted on the third joint of the finger A, which does not give a feeling of the mounting of the finger ring 1 to the user.

The power source portion 23 is a DC/DC converter that generates a predetermined internal voltage from the battery voltage supplied from the battery 22 and performs electric power supply to each portion of the finger ring 1, and is equivalent to the above power source portion 104 (FIG. 2), the s power source portion 304 (FIG. 3), the power source portion 404 (FIG. 4), or the power source portion 604 and the power source portion 615 (FIG. 5).

The voltage step-up circuit 24 is a circuit block that steps up the internal voltage generated by the power source portion 23 to produce the drive voltage for the piezoelectric bimorph cartilage conduction vibration portion 12, and is equivalent to the above voltage step-up circuit 105 (FIG. 2), the voltage step-up circuit 305 (FIG. 3), the voltage step-up circuit 405 (FIG. 4), or the voltage step-up circuit 605 (FIG. 5).

The recharge circuit 25 receives electric power supply from outside to perform recharge control of the battery 22. In the meantime, as the method for electric power supply from outside, a contact method using a USB [Universal Serial Bus] cable and the like may be used, or non-contact methods such as an electromagnetic method, an electric-field coupling method and a magnetic resonance method may be used. According to the structure that has the recharge means for the battery 22, battery replacement working becomes unnecessary, accordingly, it is possible to raise convenience of the finger ring 1. In the meantime, when forming the finger ring type housing 50 to have a waterproof structure, from the viewpoint of completely excluding an external terminal, it is desirable to employ the non-contact methods as the electric power supply method for the recharge circuit 25.

<Communication Unit>

Figure 9:
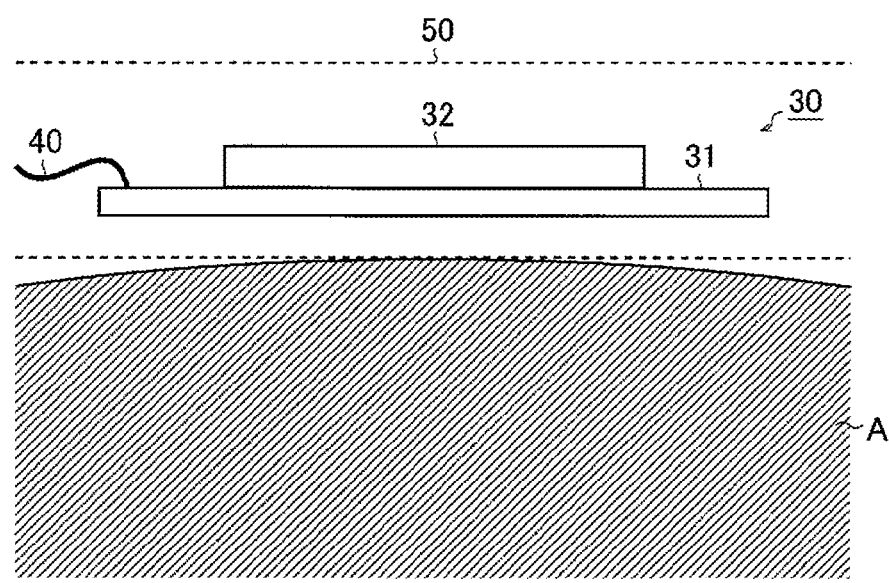
FIG. 9 is a sectional view schematically showing a structural example of a communication unit 300.

FIG. 9 is a sectional view schematically showing a structural example of the communication unit 30. The communication unit 30 in the present structural example includes: a board 31; and a wireless communication circuit 32.

The wireless communication circuit 32 is directly mounted on a front surface of the board 31. Besides, the board 31 is also connected to the cable 40 for performing electrical connection with the main unit 10.

The wireless communication circuit 32 is a circuit block that performs the short-distance wireless communication with the hearing device main body and the voice talk via the wireless telephone line, and is equivalent to the above short-distance communication portion 108 (FIG. 2), the short-distance communication portion 409 (FIG. 4), or the telephone function portion 611 (FIG. 5).

<Summing Up of the Disclosure>

The hearing system disclosed in the present specification is a hearing system that comprises a finger ring and a hearing device main body and has a structure (21st structure), in which the finger ring includes: a first short-distance wireless communication portion; a vibration output portion disposed at a position that contacts a finger to convert a voice signal, which is received by the first short-distance wireless communication portion, into a cartilage conduction vibration and outputs the cartilage conduction vibration; and a first power source portion that performs electric power supply to the first short-distance wireless communication portion and the vibration output portion; the hearing device main body includes: a second short-distance wireless communication portion that performs wireless communication with the first short-distance wireless communication portion; a microphone; a voice signal output portion that makes the second short-distance wireless communication portion output the voice signal according to a voice captured by the microphone; and a second power source portion that performs electric power supply to the second short-distance wireless communication portion, the microphone, and the voice signal output portion.

In the meantime, in the hearing system having the 21st structure, a structure (22nd structure) may be employed, in which the finger ring further includes a power-source switch that turns on/off a power source of the first power source portion; and the second power source portion is remotely controlled in accordance with an on/off-state of the power-source switch that is transmitted from the first short-distance wireless communication portion via the second short-distance wireless communication portion.

Besides, in the hearing system having the 22nd structure, a structure (23rd structure) may be employed, in which the power-source switch includes a self-holding function that holds the on-state for a predetermined self-time span; and count operation during the self-holding time span is reset at each turning-on operation of the power source portion and restarted.

Besides, in the hearing system having any one of the 21st to 23rd structures, a structure (24th structure) may be employed, in which the vibration output portion includes a piezoelectric bimorph; and the power source portion includes a voltage step-up circuit that drives the piezoelectric bimorph.

Besides, in the hearing system having any one of the 21st to 23rd structures, a structure (25th structure) may be employed, in which the vibration output portion includes an electromagnetic vibration portion.

Besides, in the hearing system having any one of the 21st to 25th structures, a structure (26th structure) may be employed, in which the hearing device main body is further connectable to an acoustic ear piece.

Besides, the hearing system having one of the 22st to 26th structures may be structured (27th structure) to be a hearing aid system.

Besides, in the hearing system having any one of the 21st, the 24th and 25th structures, the finger ring may be structured (28th structure) to further include a microphone.

Besides, a structure (29th structure) may be employed, in which the hearing system having the 28th structure is a mobile phone system.

Besides, the hearing system disclosed in the present specification is a hearing system that comprises a finger ring and a hearing device main body and has a structure (30th structure), in which the finger ring includes: a power-source switch that turns on/off a power source; a first short-distance wireless communication portion that transmits an on/off-state of the power-source switch; and a first power source portion that performs electric power supply to the first short-distance wireless communication portion; the hearing device main body includes: a second short-distance wireless communication portion that performs wireless communication with the first short-distance wireless communication portion; a microphone; a voice signal output portion that outputs a voice captured by the microphone as a hearing device voice; and a second power source portion that is remotely controlled in accordance with the on/off-state of the power-source switch, which is transmitted from the first short-distance wireless communication portion via the second short-distance wireless communication portion, and performs electric power supply to the microphone and the voice signal output portion.

Besides, the finger ring for a hearing system disclosed in the present specification is a finger ring for the hearing system, and has a structure (31st structure), which includes: a short-distance wireless communication portion; a vibration output portion disposed at a position that contacts a finger to convert a voice signal, which is received by the short-distance wireless communication portion, into a cartilage conduction vibration and outputs the cartilage conduction vibration; and a power source portion that performs electric power supply to the short-distance wireless communication portion and the vibration output portion.

In the meantime, the finger ring for a hearing system having the 31st structure may have a structure (32nd structure), which further includes a power-source switch that turns on/off a power source of the power source portion, wherein the short-distance wireless communication portion outputs an on/off-state of the power source portion to outside.

Besides, in the finger ring for a hearing system having the 32nd structure, a structure (33rd structure) may be employed, in which the power-source switch includes a self-holding function that holds the on-state for a predetermined self-time span; and count operation during the self-holding time span is reset at each turning-on operation of the power source portion and restarted.

Besides, in the finger ring for a hearing system having any one of the 31st to 33rd structures, a structure (34th structure) may be employed, in which the vibration output portion includes a piezoelectric bimorph; and the power source portion includes a voltage step-up circuit that drives the piezoelectric bimorph.

Besides, in the finger ring for a hearing system having any one of the 31st to 33rd structures, a structure (35th structure) may be employed, in which the vibration output portion includes an electromagnetic vibration portion.

Besides, in the finger ring for a hearing system having any one of the 31st to 35th structures, a structure (36th structure) may be employed, in which the hearing system is a hearing aid system.

Besides, the finger ring for a hearing system having one of the 31st, the 34th and the 35th structures may have a structure (37th structure), which further includes a microphone.

Besides, in the finger ring for a hearing system having the 37th structure, a structure (38th structure) may be employed, in which the hearing system is a mobile phone system.

Besides, the finger ring for a mobile phone disclosed in the present specification is a finger ring that is used together with the mobile phone and has a structure (39th structure), which includes: a short-distance wireless communication portion; a vibration output portion disposed at a position that contacts a finger to convert a voice signal from the mobile phone, which is received by the short-distance wireless communication portion, into a cartilage conduction vibration and outputs the cartilage conduction vibration; a microphone that converts a voice into an electric signal and transmits the signal from the short-distance wireless communication portion to the mobile phone; and a power source portion that performs electric power supply to the short-distance wireless communication portion, the vibration output portion and the microphone.

In the meantime, the finger ring for a mobile phone having the 39th structure may have a structure (40th structure), which further includes a control portion that receives an incoming alert signal via the short-distance wireless communication portion to make the power source portion start the electric power supply.

Besides, the finger ring for a mobile phone having the 40th structure may have a structure (41st structure), which further includes an incoming alert vibration portion that notifies an incoming based on the incoming alert signal.

Besides, the finger ring for a mobile phone having the 41st structure may have a structure (42nd structure), in which the vibration output portion doubles as the incoming alert vibration portion.

Besides, the finger ring for a mobile phone having any one of the 39th to the 42nd structures may have a structure (43rd structure), which further includes a manual operation switch, wherein the short-distance wireless communication portion outputs a signal corresponding to a call/answer operation by the manual switch to the mobile phone.

Besides, in the finger ring for a mobile phone having any one of the 39th to 43rd structures, a structure (44th structure) may be employed, in which the vibration output portion includes a piezoelectric bimorph; and the power source portion includes a voltage step-up circuit that drives the piezoelectric bimorph.

Besides, in the finger ring for a mobile phone having any one of the 39th to 43rd structures, a structure (45th structure) may be employed, in which the vibration output portion includes an electromagnetic vibration portion.

Besides, the finger ring type mobile phone disclosed in the present specification has a structure (46th structure), which includes: a mobile phone communication portion; a vibration output portion disposed at a position that contacts a finger to convert a voice signal received by the mobile phone communication portion into a cartilage conduction vibration and outputs the cartilage conduction vibration; a microphone that converts a voice into an electric signal and outputs the signal from the mobile phone communication portion; and a power source portion that performs electric power supply to the mobile phone communication portion, the vibration output portion and the microphone.

In the meantime, the finger ring type mobile phone having the 46th structure may have a structure (47th structure), which further includes an incoming alert vibration portion that notifies an incoming.

Besides, the finger ring type mobile phone having the 47th structure may have a structure (48th structure), in which the vibration output portion doubles as the incoming alert vibration portion.

Besides, in the finger ring type mobile phone having any one of the 46th to the 48th structures, a structure (49th structure) may be employed, in which the vibration output portion includes a piezoelectric bimorph; and the power source portion includes a voltage step-up circuit that drives the piezoelectric bimorph.

Besides, in the finger ring type mobile phone having any one of the 46th to the 48th structures, a structure (50th structure) may be employed, in which the vibration output portion includes an electromagnetic vibration portion.

Besides, the voice hearing method disclosed in the present specification has a structure (51st structure) which has: a step for converting a voice signal into a cartilage conduction vibration and transmits the vibration to a finger; and a step for pressurizing the finger against a cartilage.

In the meantime, in the voice hearing method having the 51st structure, a structure (52nd structure) may be employed, in which the cartilage is a tragus cartilage.

<Other Variations>

In the meantime, besides the above embodiments, it is possible to add various modifications to the structure of the present invention without departing from the spirit of the present invention. In other words, it should be understood that the above embodiments are examples in all respects and are not limiting. The technological scope of the present invention is not indicated by the above description of the embodiments but by the claims, and all modifications within the scope of the claims and the meaning equivalent to the claims are covered.

For example, in the above embodiments, the description is performed, in which the hearing aid system and the mobile phone system are the hearing systems independent of each other; however, the structure of the present invention is not limited to this, and it is also possible to build a hearing system that includes both the hearing aide function and the mobile phone function.

INDUSTRIAL APPLICABILITY

The present invention is usable to achieve, for example, a hearing aid system and a mobile phone system that use the cartilage conduction and are useful.

REFERENCE SIGNS LIST

A finger
B ear
C ear cartilage (tragus)
1 finger ring
2 hearing device main body
3 ear piece
10 main unit
11 first board
12 piezoelectric bimorph cartilage conduction vibration portion
13 control portion
14 drive portion
15 connector
16 second board
17 operation portion
20 power source unit
21 board
22 battery
23 power source portion
24 voltage step-up portion
25 recharge circuit
30 communication unit
31 board
32 wireless communication circuit
40 cable
50 finger ring type housing
100 finger ring
101 piezoelectric bimorph cartilage conduction vibration portion
102 drive portion
103 control portion
104 power source portion
105 voltage step-up circuit
106 self-holding timer (power source switch)
107 remote control switch operation portion
108 short-distance communication portion
200 hearing aid main body
201 short-distance communication portion
202 ear piece connection portion
203 control portion
204 voice signal output portion
205 microphone
206 switch operation portion
207 power source switch
208 power source portion
300 finger ring
301 piezoelectric bimorph cartilage conduction vibration portion
302 drive portion
303 control portion
304 power source portion
305 voltage step-up circuit
306 self-holding timer (power source switch)
307 remote control switch operation portion
308 microphone
309 voice signal output portion
310 echo canceller
400 finger ring type voice transmission/reception attachment
401 piezoelectric bimorph cartilage conduction vibration portion
402 drive portion
403 control portion
404 power source portion
405 voltage step-up circuit
406 microphone
407 voice signal output portion
408 echo canceller
409 short-distance communication portion
410 call/answer operation portion 500 mobile phone main body
501 short-distance communication portion
502 voice signal input portion
503 voice signal output portion
504 telephone function portion
504a voice transmission portion
504b voice reception portion
504c telephone communication portion
505 microphone
506 speaker
507 display portion
508 storage portion
509 control portion
510 power source portion
511 power source switch
512 switch operation portion
600 finger ring type mobile phone
601 piezoelectric bimorph cartilage conduction vibration portion
602 drive portion
603 control portion
604 power source portion
605 voltage step-up circuit
606 microphone
607 voice signal output portion
608 echo canceller
609 voice signal input portion
610 voice signal output portion
611 telephone function portion
611a voice transmission portion
611b voice reception portion
611c telephone communication portion
612 display portion
613 storage portion
614 control portion
615 power source portion
616 power source switch
617 switch operation portion

The invention claimed is:

1. A finger ring used for a hearing system, comprising:
a short-distance wireless communication portion;
a vibration output portion disposed at a position that contacts a finger to convert a voice signal, which is received by the short-distance wireless communication portion, into a cartilage conduction vibration and outputs the cartilage conduction vibration;
a power source portion that performs electric power supply to the short-distance wireless communication portion and the vibration output portion; and
a power-source switch that turns on/off a power source of the power source portion, wherein the short-distance wireless communication portion outputs an on/off-state of the power source portion to outside;
wherein the power-source switch includes a self-holding function that holds the on state for a predetermined self-time span; and
wherein count operation during the self-holding time span is reset at each turning on operation of the power source portion and restarted.

2. A finger ring used for a hearing system, comprising:
a short-distance wireless communication portion;
a vibration output portion disposed at a position that contacts a finger to convert a voice signal, which is received by the short-distance wireless communication portion, into a cartilage conduction vibration and outputs the cartilage conduction vibration; and
a power source portion that performs electric power supply to the short-distance wireless communication portion and the vibration output portion,
wherein the vibration output portion includes a piezoelectric bimorph; and
wherein the power source portion includes a voltage step-up circuit that drives the piezoelectric bimorph.

3. The finger ring according to claim 2, wherein the vibration output portion includes an electromagnetic vibration portion.

4. The finger ring according to claim 2, wherein the hearing system is a hearing aid system.

5. The finger ring according to claim 2, further comprising a microphone.

6. A finger ring used for a mobile phone system as a hearing system, comprising:
a short-distance wireless communication portion;
a vibration output portion disposed at a position that contacts a finger to convert a voice signal, which is received by the short-distance wireless communication portion, into a cartilage conduction vibration and outputs the cartilage conduction vibration;
a power source portion that performs electric power supply to the short-distance wireless communication portion and the vibration output portion;
a control portion that receives an incoming signal via the short-distance wireless communication portion to make the power source portion start the electric power supply; and
an incoming alert vibration portion that notifies a phone call based on the incoming signal.

7. The finger ring according to claim 6, wherein the vibration output portion doubles as the incoming alert vibration portion.

8. A finger ring used for a mobile phone system as a hearing system, comprising:
a short-distance wireless communication portion;
a vibration output portion disposed at a position that contacts a finger to convert a voice signal, which is received by the short-distance wireless communication portion, into a cartilage conduction vibration and outputs the cartilage conduction vibration;
a power source portion that performs electric power supply to the short-distance wireless communication portion and the vibration output portion; and
a manual operation switch, wherein the short-distance wireless communication portion outputs a signal corresponding to a call/answer operation by the manual switch to the mobile phone.

9. A finger ring used for a mobile phone system as a hearing system, comprising:
a short-distance wireless communication portion;
a vibration output portion disposed at a position that contacts a finger to convert a voice signal, which is received by the short-distance wireless communication portion, into a cartilage conduction vibration and outputs the cartilage conduction vibration; and
a power source portion that performs electric power supply to the short-distance wireless communication portion and the vibration output portion,
wherein the vibration output portion includes a piezoelectric bimorph; and
wherein the power source portion includes a voltage step-up circuit that drives the piezoelectric bimorph.

10. The finger ring according to claim 8, wherein the vibration output portion includes an electromagnetic vibration portion.

11. The finger ring according to claim 8, wherein the vibration output portion outputs the cartilage conduction vibration that is transmittable to an ear cartilage via a finger when the finger contacts the ear cartilage.

12. The finger ring according to claim 11, wherein the ear cartilage is of a tragus.

\* \* \* \* \*